United States Patent
Jiang et al.

(10) Patent No.: US 11,101,906 B1
(45) Date of Patent: Aug. 24, 2021

(54) END-TO-END TESTING OF LIVE DIGITAL MEDIA STREAMING

(71) Applicant: Microsoft Technology Licensing, LLC, Redmond, WA (US)

(72) Inventors: Yurong Jiang, Santa Clara, CA (US); Karthiek Chandrasekaran, Fremont, CA (US); Ming Hui Hu, Sunnyvale, CA (US); Aravind Sethuraman, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/917,369

(22) Filed: Jun. 30, 2020

(51) Int. Cl.
| H04H 20/12 | (2008.01) |
| H04N 21/24 | (2011.01) |
| H04N 21/2662 | (2011.01) |
| H04N 21/2187 | (2011.01) |

(52) U.S. Cl.
CPC ........ *H04H 20/12* (2013.01); *H04N 21/2187* (2013.01); *H04N 21/2402* (2013.01); *H04N 21/2662* (2013.01)

(58) Field of Classification Search
CPC ............. H04N 21/187; H04N 21/2402; H04N 21/2662; H04H 20/12
USPC ........................................................ 709/224
See application file for complete search history.

(56) References Cited

U.S. PATENT DOCUMENTS

| 2011/0231522 | A1* | 9/2011 | Knight | .................... G06F 16/48 |
| | | | | 709/219 |
| 2013/0242185 | A1* | 9/2013 | Roth | .................. H04N 21/2343 |
| | | | | 348/441 |
| 2016/0353140 | A1* | 12/2016 | Miller | ................ H04N 21/2187 |
| 2018/0262783 | A1* | 9/2018 | Yang | .................. H04N 21/2404 |
| 2019/0066664 | A1* | 2/2019 | Miller | ..................... G10L 25/57 |
| 2019/0141368 | A1* | 5/2019 | Loheide | ........... H04N 21/23439 |
| 2019/0289052 | A1* | 9/2019 | Boutet | .................. H04L 65/608 |
| 2020/0077161 | A1* | 3/2020 | Lohmar | ................ H04L 65/602 |
| 2020/0322412 | A1* | 10/2020 | Kellicker | .............. H04L 65/608 |

OTHER PUBLICATIONS

Firsanov, Konstantine, "HLS vs. RTMP Live Streaming Load Testing with JMeter", Retrieved from: https://www.blazemeter.com/blog/hls-vs-rtmp-live-streaming-load-testing-with-jmeter, Jun. 12, 2018, 15 Pages.

* cited by examiner

*Primary Examiner* — Frantz B Jean
(74) *Attorney, Agent, or Firm* — Hickman Becker Bingham Ledesma LLP; Adam C. Stone

(57) ABSTRACT

Computer-implemented techniques facilitate end-to-end testing of a live streaming service and a content management service providing a live streaming platform integrated with live streaming service. The techniques can be used to test live stream ingestion as well as live stream delivery. Further, the techniques encompass a live player that can be used to test delivery and consumption of adaptive bitrate live streams that are delivered from endpoint servers of the live streaming service.

20 Claims, 12 Drawing Sheets

Live Streaming Testing Environment 100

END-TO-END TESTING OF LIVE DIGITAL MEDIA STREAMING

TECHNICAL FIELD

The present disclosure generally relates to testing distributed computing systems, and relates more specifically, to techniques for end-to-end testing of live digital media streaming systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In live streaming, tools and techniques for testing live digital media streaming systems are few and far between. Current testing solutions have been found to be ineffective or incomplete, so that improved solutions are needed.

DETAILED DESCRIPTION

Figure 1:
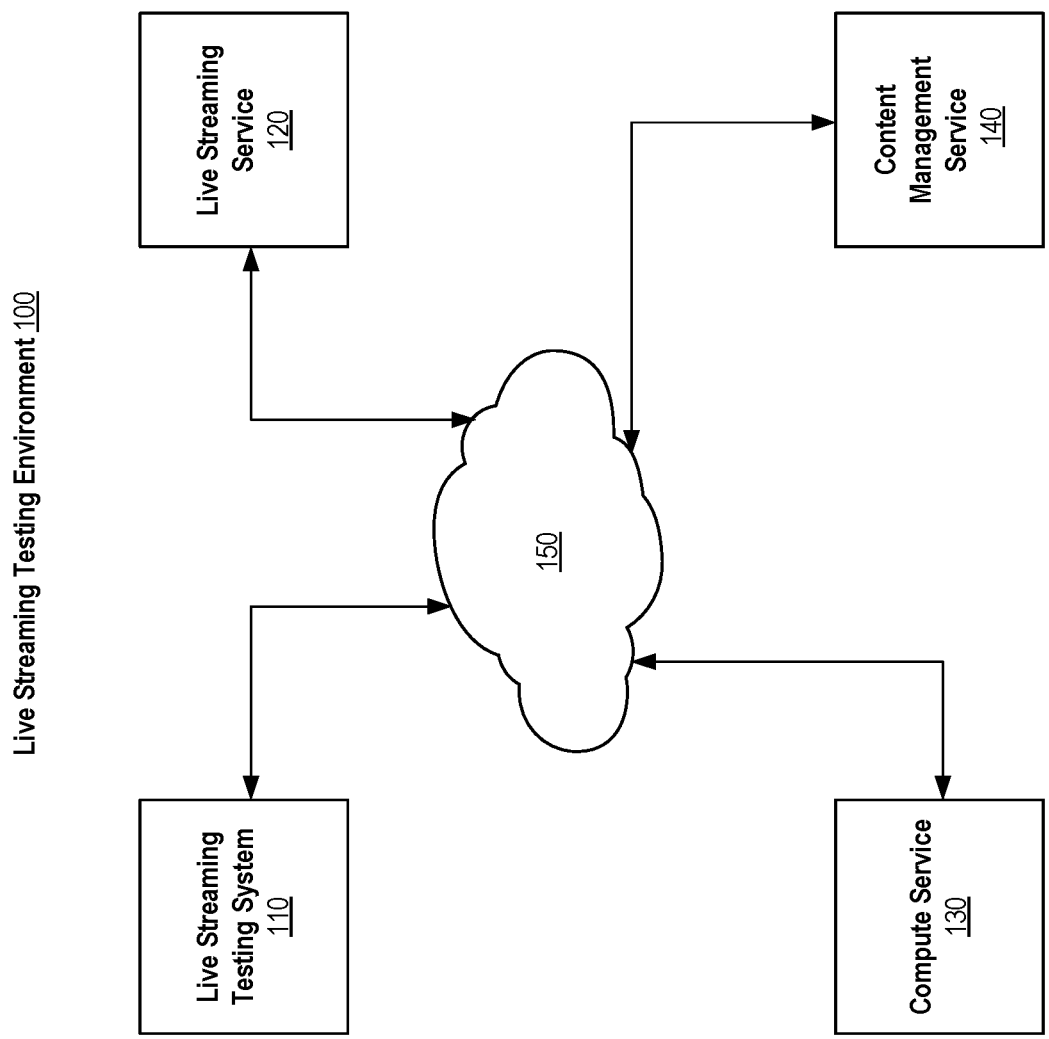
FIG. 1 illustrates one example of a networked computing environment for end-to-end testing of live digital media streaming.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

The example embodiment(s) are described herein according to the following outline:
1.0 General Overview
2.0 Example Testing Environment
   2.1 Live Streaming Testing System
      2.1.1 Test Scheduler
      2.1.2 Traffic Generator
      2.1.3 Ingest bot
      2.1.4 Listener and Validator
      2.1.5 Post Generator
      2.1.6 Live Player
      2.1.7 Cleaner
      2.1.8 Reporting System
3.0 Example Process
4.0 Implementation Mechanisms—Hardware Overview
5.0 Other Aspects of the Disclosure
1.0 General Overview A live digital media streaming system (live streaming system) is a centralized network computing service that is capable of both simultaneously ingesting and delivering live digital media streams (live streams). A live stream is a real-time transmission of audio and/or video of an event over a data communications network such as, for example, the Internet. In the live streaming context, real-time means that audio and/or video for the event is input to the live streaming system in a continuous fashion and is made available for processing or playback within a short period of time after it is received by the live streaming system. The short period of time can be as small as a few milliseconds (or possibly even smaller) or up to a few minutes.

Various different types of events can be live streamed via live streaming systems including, for example, instructional presentations, sporting events, video gaming contests, ceremonies (e.g., weddings, commencements, etc.), guest interviews, expertise demonstrations (e.g., a cooking demonstration), news reporting (e.g., a live weather report), or other event content.

Testing live streaming systems is important for understanding the performance characteristics of the system. Testing live streaming systems is traditionally focused on the playback experience. However, testing the playback experience is only part of the testing picture. Errors and issues can occur with ingestion of live streams too. Ingestion of a live stream can include digital media preparation such as transcoding the input digital media stream as well as other functions supporting live streaming such as, for example, live speech transcription, archiving, and preview monitoring. It is important that a live stream is ingested properly since an erroneous or slow ingestion can affect the playback experience. The present disclosure provides improved techniques for end-to-end testing of live streaming systems.

In some embodiments, a live digital media streaming testing system (live testing system) is programmed or configured to schedule live digital media streaming tests (live streaming tests) for execution against a live digital media streaming service (live streaming service). As part of executing the particular live streaming test, a compute service is triggered to send a test ingest feed to the live streaming service and a test playback feed corresponding to the test ingest feed is downloaded from one or more endpoint servers associated with the live streaming service. Also, as part of executing the particular live streaming test, one or more ingest metrics and one or more playback metrics are obtained. In some embodiments, the metrics may be sent to a reporting system that can store the metrics and/or generate reports or notifications regarding the metrics. The above operations can be repeated for other scheduled live streaming tests when the time to execute those tests arises.

The live testing system is an improvement over existing testing systems that focus only on the playback side. By testing and obtaining metrics for both ingestion and delivery of a live stream, the live testing system provides a more comprehensive live streaming testing solution.

While each of the drawings figures illustrates a particular embodiment for purpose of illustrating a clear example, other embodiments may omit, add to, reorder, and/or modify any of the elements shown in the drawing figures.

2.0 Example Testing Environment

FIG. 1 depicts example network computing system environment 100 in which end-to-end testing of live streaming may be conducted, according to some embodiments of the present invention. Environment 100 includes live streaming testing system 100 ("testing system 100"), live streaming service 120, compute service 130, and content management service 140.

In environment 100, testing system 110, live streaming service 120, compute service 130, and content management service 140 are interconnected by data communications network 150. Data communications network 150 may encompass electric, electromagnetic and/or optical means for carrying digital data messages and streams between networked computing devices. In some embodiments, data communications network 150 may be composed of multiple data communications networks including, for example, two or more of: the Internet, a Local area Network (LAN), a Wide Area Network (WAN), the Published Switched Telephone Network (PSTN), a wireless network (e.g., an IEEE 802.11 network), a cellular network (e.g., GSM, LTE, etc.), or a satellite network.

Testing system 110, live streaming service 120, compute service 130 and content management service 140 may communicate using any suitable data networking techniques such as the Internet Protocol (e.g., IPv4 or IPv6), the Transmission Control Protocol (TCP), the User Datagram Protocol (UDP), the HyperText Transfer Protocol (HTTP), the Secure HyperText Transfer Protocol (HTTPS), or the Real-Time Messaging Protocol (RTMP) including any RTMP variants (e.g., RTMP, RTMPS, RTMPE, RPMPT, or RTMFP).

As mentioned, live streaming service 120 is a centralized network computing service that is capable of both simultaneously ingesting and delivering live digital media streams (live streams). For this, live streaming service 120 may offer network accessible application programming interfaces (APIs) for carrying out live streaming operations including ingest and delivery operations.

On the ingest side, live streaming service 120 may offer media processing capabilities such as, for example, live speech transcription, archiving, and preview monitoring. On the delivery side, live streaming service 120 may integrate with content delivery network (CDN) providers so that live stream content is served from endpoint servers that are physically closer to the end-user computing devices playing back the live streams.

In this description, the term "endpoint server" encompasses an origin server of live streaming service 120 or a cache server of a CDN that stores live streaming content that is ready for playback. CDN cache servers may pull or request live streaming content from origin servers based on receiving network requests from end-user computing devices for the content. In addition, or alternatively, live streaming content may be proactively pushed or sent to CDN cache servers by live streaming service 120 in anticipation of the content being requested from the cache servers by end-user computing devices.

In some embodiments, content management service 140 uses live streaming service 120 to provide a live streaming platform to its users. Content management service 140 can be virtually any network computing service providing one or more applications to users that allow for the creation and management of digital content. In some embodiments, content management service 140 encompasses a social or professional network whereby users are connected to other users in the network by relationships that the users mutually accept thereby forming degrees of relationships in the network. For example, users A and B may mutually accept each other as friends and users B and C may mutually accept each other as friends. In this simple example, users A and B have a first-degree relationship with each other as do users B and C. Users A and C have a second-degree relationship with each other by virtue of their common friendship with user B.

In some embodiments, an application of content management service 140 provides personalized content feeds to users of content management service 140. The personalized content feeds may be provided by content management service 140 as data sent over a data communications network (e.g., 150) to the users' personal computing devices for presentation in a graphical user interface (e.g., web browser application or mobile phone application) at the devices. Within a personalized content feed presented to a user, there are content items selected by content management service 140 for inclusion in the feed. Such selection may be based on numerous factors including, for example, the digital content creation activity (e.g., content posts, likes, comments, favorites, etc.) of the user's first-degree connections in the social or professional network. In some embodiments, live streams established using the live streaming platform that are available for playback are announced to users of content management service 140 as content items presented in their personalized content feeds. The users can click on or otherwise select the streaming locator in such a content item to begin consuming the corresponding live stream.

As part of providing a live streaming platform to its users, content management service 140 may provide a web browser application or mobile phone application or other client application to users holding user accounts with content management service 140. Using the client application, a user of content management service 140 can broadcast a live stream to other users of content management service 140. The client application may also be used by the other users to playback the live stream.

In some embodiments, the operations involved in a live stream facilitated by content management service 140 that integrates with live streaming service 120 include the following operations. First, a user of content management service 140 uses the client application to register with content management service 140 to broadcast a live stream. As part of this registration, a broadcasting user might use the client application to provide a name and a short text description of the live stream, as well potentially tag connected users in the broadcasting user's professional or social network. The broadcasting user may be an individual or a group, company, or other organization.

In response to the registration request from the broadcast user, content management service 140 returns an ingest locator for the live stream to the broadcasting user. In some embodiments, the ingest locator is a Uniform Resource Indicator (URI) identifying a network location or address at which a test ingest feed for a live stream can be provided to live streaming service 140 according to a ingest protocol. In some embodiments, the ingest protocol may be one of the following ingest protocols: multi-bitrate RTMP, multi-bitrate RTMPS, the MICROSOFT SMOOTH STREAMING protocol, the Dynamic Adaptive Streaming over HTTP (DASH) protocol, or other suitable live streaming ingest protocol.

Content management service 140 may obtain the ingest locator from live streaming service 120 in response to requesting live streaming service 120 to setup and prepare for a new live stream. Content management service 140 then returns the ingest locator obtained from live streaming service 120 to the broadcasting user in the response to the registration request from the broadcast user. The ingest locator can be used at the broadcast user's location to send an ingest feed captured at the broadcast user's location to live streaming service 120. The ingest feed may encompass a digital data stream of digital audio and/or digital video of an event captured over time at the broadcast user's location (e.g., via a video camera and microphone) and sent to live streaming service 120 using the ingest locator.

After the live stream is started by the broadcast user and live streaming service 120 begins receiving the ingest feed sent from the broadcast user's location, live streaming service 120 may notify content management service 140 that the live stream is ready to be played back. The notification may include a streaming locator for playing back the live stream. In some embodiments, the streaming locator, like the ingest locator, is a Uniform Resource Indicator (URI) associated with live streaming service 120.

Content management service 140 may generate a content post about the live stream on behalf of the broadcasting user in response to receiving the streaming locator from live streaming service 120. Such notification might involve, for example, posting a content feed item in selected users' personalized content feeds managed by content management service 140. The content feed item might notify the viewer of the content feed item that the broadcasting user is "Live Now" and include, for example, the name and description of the live feed provided by the broadcasting user and include the streaming locator that can be used to begin viewing the live stream.

In some embodiments, compute service 130 provides virtualized computing containers that are spawned on-demand and execute for a configurable amount of execution time (e.g., between 1 second and 15 minutes). As a baseline configuration, each virtualized container may be configured with an operating system (e.g., a UNIX variant) for executing tasks on the operating system instance, a configurable amount of random-access memory (e.g., between 128 MegaBytes and 3 GigaBytes) and a configurable amount of ephemeral storage (e.g., 512 MegaBytes) that is discarded when the container is terminated. In some embodiments, a task that is executed in a virtualized computing container by compute service 130 encompasses a computer program to send a test ingest feed over network 150 to live streaming service 120 at a given ingest locator.

While in some implementations, live streaming service 120, compute service 130, and content management service 140 are each operated by different online service providers, two or all three of these services are provided by the same online service provider.

In some implementations, more than one live streaming service 120 may be tested by testing system 110. Although the description below refers to a single live streaming service 120, the techniques may also be applied with more than one live streaming service 120.

In one example implementation, live streaming service 120 is the AZURE MEDIA SERVICES provided by Microsoft Corporation of Redmond, Wash. Compute service 130 is the AWS LAMBDA service provided by Amazon.com, Inc. of Seattle, Wash. Content Management Service 140 is the LINKEDIN business and employment oriented online service provided by LinkedIn of Mountain View, Calif. which provides the LINKEDIN LIVE live streaming platform.

2.1 Live Streaming Testing System

Figure 2:
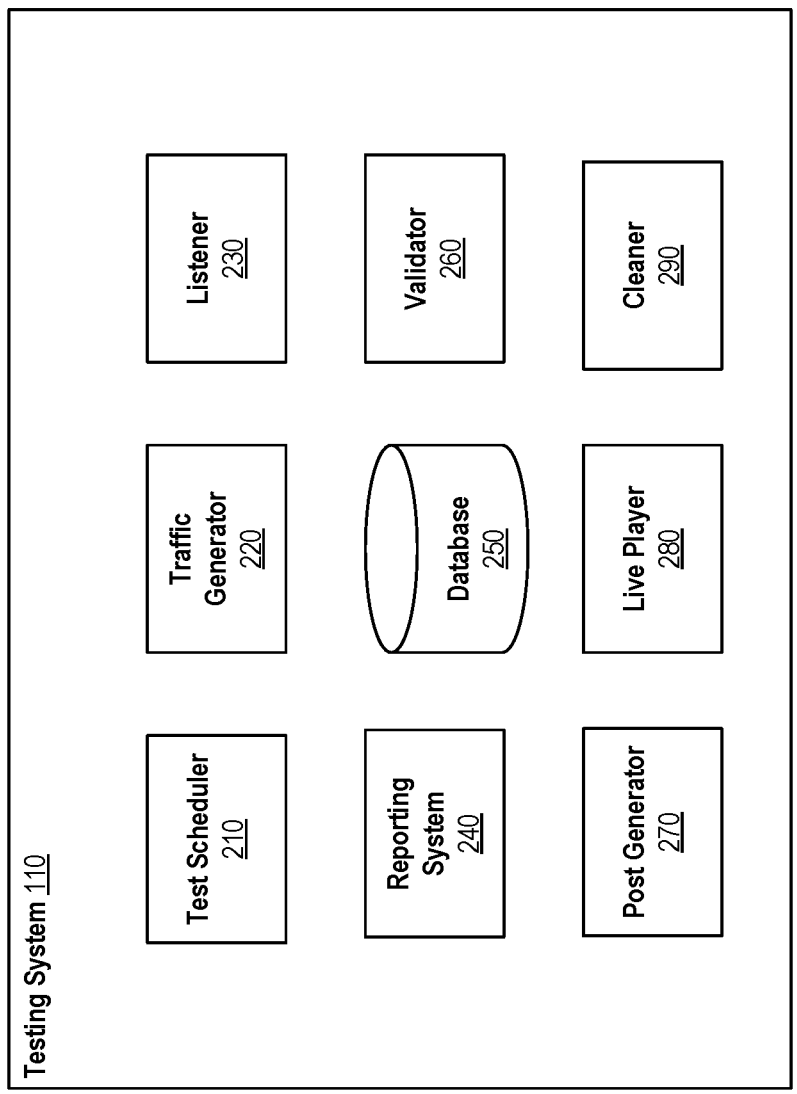
FIG. 2 illustrates one example of a live streaming testing system in the example networked computing environment.

FIG. 2 illustrates testing system 110 for end-to-end testing of live streaming in greater detail, according to some embodiments. Testing system 110 includes test scheduler 210, traffic generator 220, listener 230, reporting system 240, database 250, validator 260, post generator 270, live player 280, and cleaner 290.

The functions and operations described herein as being performed by test scheduler 210, traffic generator 220, listener 230, reporting system 240, database 250, validator 260, post generator 270, live player 280, and cleaner 290 can be implemented in hardware, in software, or a combination of hardware and software. The choice of implementing any portion of the above testing system 110 in hardware or software may depend on the requirements of a particular implementation. A software module or program code may reside in volatile memory, nonvolatile memory, RAM, flash memory, ROM, EPROM, or any other form of a non-transitory computer-readable storage medium.

Generally, test scheduler 210 defines and manages the live streaming testing schedule and initiates execution of a live streaming test when the time for executing test arises according to the testing schedule. For example, the testing schedule configured (e.g., user configured) with test scheduler 210 may include a test that is to execute at the top of the hour of every day. In some embodiments, live streaming service 130 has points-of-presence in different geographic locations. In these embodiments, separate tests may be scheduled and executed to test the live streaming service 120 in the different geographic regions. Thus, test scheduler 210 can be used to run multiple end-to-end live streaming tests including periodically running tests at different times and in different geographic regions.

As part of executing a live streaming test, traffic generator 220 uses compute service 130 to generate one or more test ingest feeds for ingestion by live streaming service 120. By using compute service 130, the amount of ingestion network traffic that can be fed to live streaming service 120 when testing is not constrained by the computing resources available to testing system 110, which may be considerably less than the computing resources available to compute service 130. Instead, the greater computing resources of compute service 130 can be used to generate a desired amount of ingestion network traffic including feeding many live streams to live streaming service 120 concurrently.

During execution of a live streaming test, listener 230 may receive status messages from the live streaming platform of content management system 140 that pertain to the test. Such status messages may notify about various aspects of live streams under test. For example, listener 210 may receive a status message that notifies that a test ingest feed being fed to (ingested by) live streaming service 120 from compute service 130 is ready to be consumed (played back) from live streaming service 120. In response to receiving such a status message, live player 280 can begin consuming the live stream from live streaming service 120 for the purpose of testing the playback side of the live stream.

Reporting system 240 processes test results in database 250 and generate reports or notifications regarding the test results. Database 250 stores status messages received by listener 230 as well as test result metrics reported from traffic generator 220 and from live player 280. Validator 260 receives status messages from listener 230, processes them as appropriate, and stores them in database 250. Post generator 270 tests the automatic live stream content post functionality of content management service 140. Live player 280 consumes live streams from live streaming service 120 and provides playback metrics. Cleaner 290 is responsible for cleaning up data artifacts of live streaming tests that have completed.

The functionality and operations of these testing system 110 modules are described in greater detail below.

2.1.1 Test Scheduler

Figure 3:
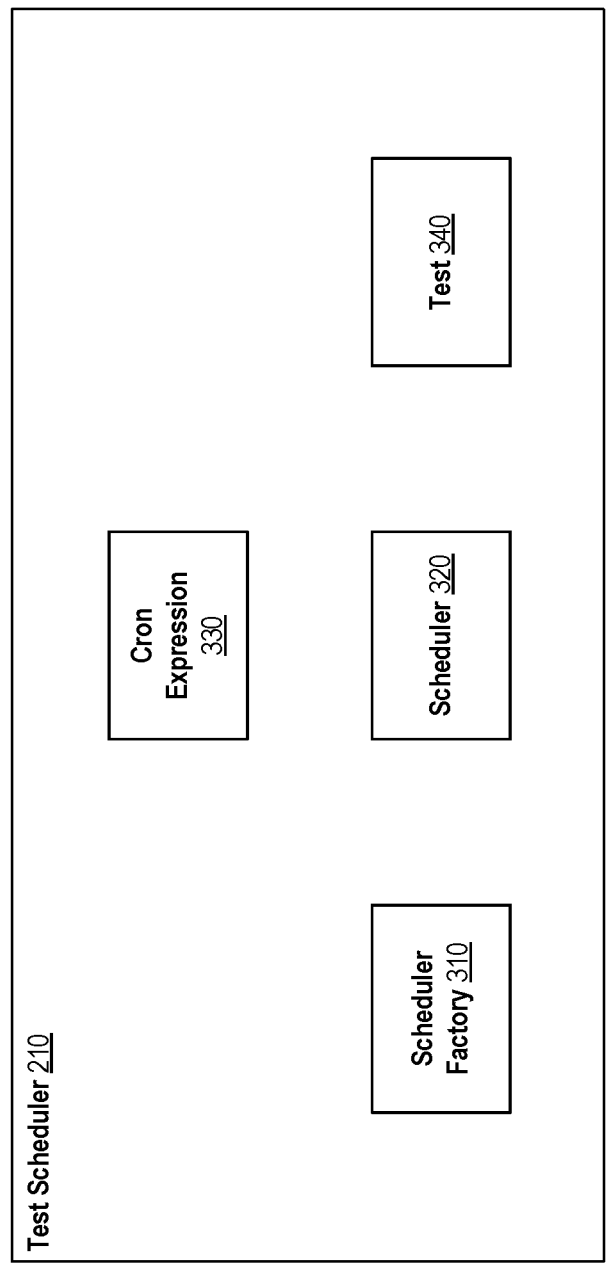
FIG. 3 illustrates one example of a test scheduler of the example live streaming testing system.

FIG. 3 illustrates test scheduler 210 for end-to-end testing of live streaming in greater detail, according to some embodiments. Test scheduler 210 uses cron triggers to schedule tests. To do this, an instance of scheduler factory 310 is obtained by test scheduler 210. Test scheduler 210 uses scheduler factory 310 to obtain an instance of scheduler 320. Test scheduler 210 then schedules test 340 to execute periodically at fixed dates, or intervals as specified in cron expression 330. In this way, live streaming tests can be conducted repeatedly.

In some implementations, live streaming service 120 has points-of-presence (e.g., computing servers providing live streaming functionality) in various geographic regions around the world and test 340 is configured (e.g., user configured) with location data that specifies the geographic region in which to test live streaming service 120. For example, live streaming service 120 may have points-of-presence in data centers around the globe or otherwise different regions over a geographic area. Test scheduler 210 can schedule test 340 for one of those regions where live streaming service 120 in that region is tested by test 340. For example, test scheduler 210 can be scheduled with a first test to test live streaming service 120 in the Western United States (e.g., in California) and be scheduled with a second test to test live streaming service 102 in the Eastern United States (e.g., in New Jersey).

Further, test scheduler 210 can schedule test 340 to execute at particular time in in a particular geographic region such as, for example, once a week at two in the morning on Sundays in that region or at another time at which it is desired to conduct test 340 in that region. Multiple tests may be scheduled in this way to periodically test live streaming service 120 in different geographic regions and at different times.

2.1.2 Traffic Generator

Figure 4:
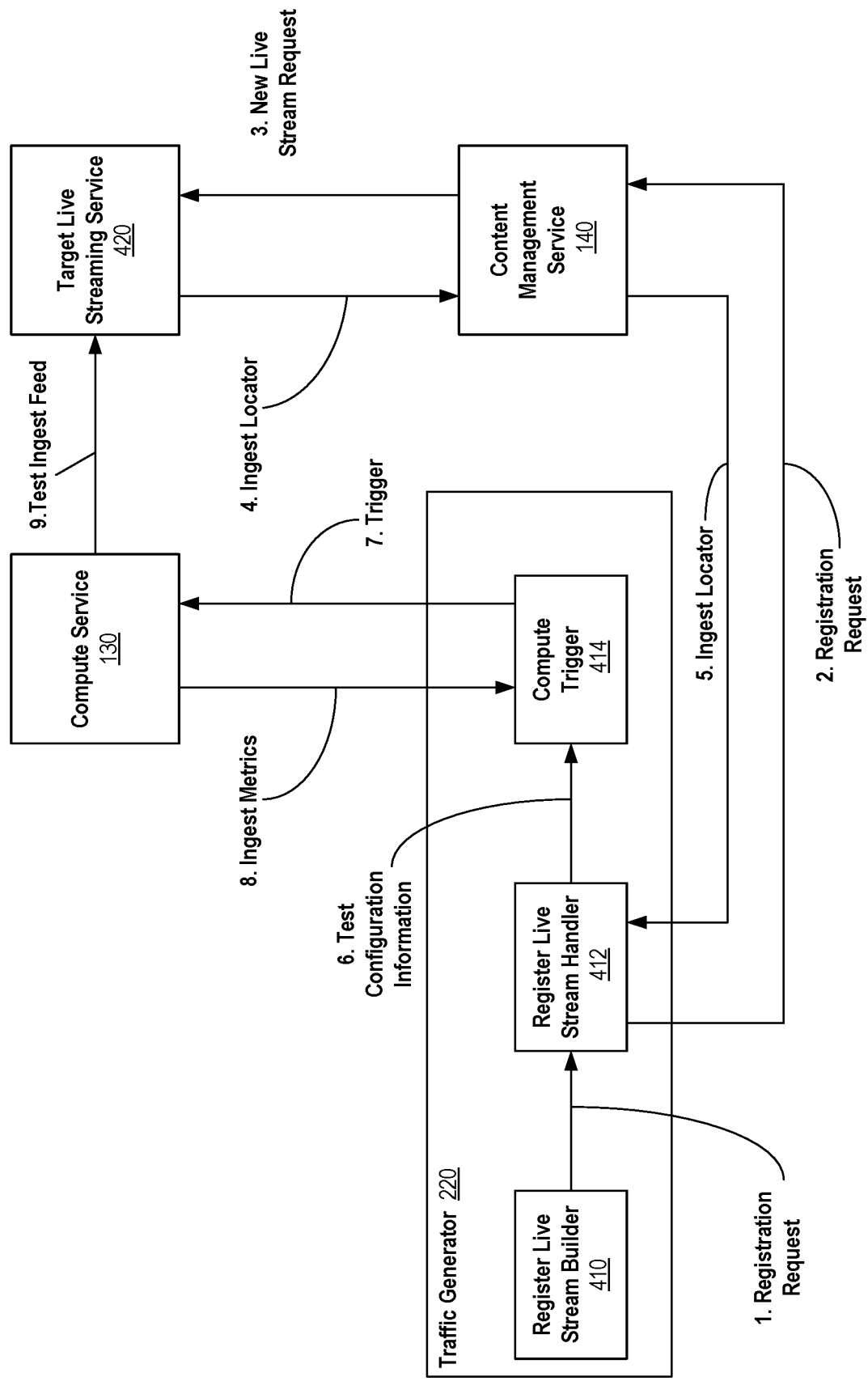
FIG. 4 illustrates one example of a traffic generator of the example live streaming testing system.

FIG. 4 illustrates traffic generator 220 for end-to-end testing of live streaming in greater detail, according to some embodiments. When test 340 is executed, traffic generator 220 is signaled to generate live stream ingestion traffic into target live streaming service 420. Target live streaming service 420 can be live streaming service 120 or a point-of-presence provided by live streaming service 120 in a particular geographic region. As mentioned earlier, live streaming service 120 may have multiple points-of-presence providing live streaming functionality around the world or over a large geographic area. A reason for this is to reduce the network latency for ingest of an ingest feed by reducing the physical distance between the broadcaster's location and the point-of-presence in the broadcaster's geographic region.

Test 340 may be configured (e.g., user configured) with test metadata describing the configuration of test 340. The test metadata may specify, among other things, the geographic region of the live streaming service 120 to use for test 340 (target live streaming service 120 in FIG. 4). The geographic region may be designated variously including by city, state, country or other moniker that designates a geographic region (e.g., "US WEST 1," "US WEST 2", "CHINA NORTH," "EAST ASIA," etc.) In addition, the test metadata may specify, among other things, the length of time for the live stream (stream length) and the ingest protocol to use. The stream length may be a clock time for the live stream such as, for example, ten minutes or another suitable clock time. The ingest protocol can be any standard data communications protocol for ingesting a live stream into target live streaming service 120 that target live streaming service 120 supports. For example, the media ingest protocol can be one of: multi-bitrate RTMP, multi-bitrate RTMPS, the MICROSOFT SMOOTH STREAMING protocol, the Dynamic Adaptive Streaming over HTTP (DASH) protocol, or other suitable ingest protocol.

A test ingest feed that is generated by traffic generator 220 for ingest by target live streaming service 420 may be composed of pre-captured audio and/or video. For example, a test ingest feed may be pre-captured and pre-encoded and stored in a file. Compute service 130 can then stream the pre-captured and pre-encoded test ingest feed read from the file to live streaming service 120. In this way, ingest of a live stream can be tested without requiring use of media capture equipment (e.g., video cameras, microphones, media mixers, etc.) during the test.

Different test ingest feeds of different tests may be composed of differently formatted digital audio and/or digital video for the purpose of testing how target live streaming service 420 handles the differently formatted digital audio and/or video. For example, different container/file formats can be used for a test ingest feed for containing digital audio and digital video in the test ingest feed. Such different container/file formats may include, for example, FLV, MXF, GXF, MPEG2-PS, MPEGS2-TS, 3GP, WMV, AVI, MP4, DVR-MS, MATROSKA/WEBM, WAVE/WAVE, or QUICKTIME.

Different video codecs can be used for a test ingest feed for encoding digital video in the test ingest feed. Such different video codecs may include, for example, AVC-8 BIT 4:2:0, AVC-8 BIT 4:2:2, AVID DNxHD in MXF containers, DVCPro/DVCProHD in MXF containers, DIGITAL VIDEO (VD) in AVI containers, MPEG 200, MPEG-2, MPEG-1, VC-1/WMV9, CANOPUS HQ/HQ1, MPEG-4 Part 2, THEORA, YU420 uncompressed, YU420 mezzanine, APPLE ProRes 422, APPLE ProRes 422 LT, APPLE ProRes 422 HQ, APPLE ProRes PROXY, APPLE ProRes 4444, APPLE ProRes 4444 XQ, or HEVC/H.265.

Different audio codecs can be used for a test ingest feed for encoding digital audio in the test ingest feed. Such different audio codecs may include, for example, AAC, MPEG LAYER 2, MP3, WINDOWS MEDIA AUDIO, WAV/PCM, FLAC, OPUS, VORBIS, AMR, AES, DOLBY E, DOLBY DIGITAL (AC3), or DOLBY DIGITAL PLUS (E-AC3).

Different video resolutions, framerates, and bitrates can also be tested. For example, the digital video of a test ingest feed can be encoded with different video resolutions such as, for example, with a resolution height of 1080, 720, 540, 360, 270 or 180, encoded with different framerates such as, for example, 29.970 or 23.970, or encoded with different bitrates (in kbps) 6780, 3520, 2940, 2210, 1850, 1150, 960, 720, 700, 600, 440, 380 or 2230.

The quality of the video content of a test ingest feed can also vary for testing purposes. The quality can be measured according to various perceptual video quality metrics such as, for example, peak signal-to-noise ration (PSNR) and/or Video Multimethod Assessment Fusion (VMAF). More information on PSNR can be found on the Internet at /wiki/Peak signal-to-noise ratio in the Wikipedia.org domain. More information on VMAF can also be found on the Internet at/wiki/Video Multimethod Assessment Fusion in the Wikipedia.org domain.

A reason for using differently formatted test ingest feeds may be to test how target live streaming service 420 packages the test ingest feed for adaptive bitrate streaming. Adaptive bitrate streaming is described in greater detail below. However, in general, adaptive bitrate streaming in the context of live streaming refers to processing that may be performed by target live streaming service 420 on a high bitrate or multi-bitrate input digital media stream ingested by target live streaming service 420 so as to make the live stream available for playback at multiple different bitrates (and hence multiple different media playback qualities). The playback device can select the most appropriate bitrate for download from target live streaming service 420 depending on the network bandwidth and network congestion between the playback device and target live streaming service 420. With adaptive bitrate streaming, the playback device may seamlessly switch between different bitrates in response to detecting changes in the level of network congestion.

The different bitrates and media quality at which target live streaming service 420 packages an input media stream for adaptive bitrate streaming is sometimes referred to as the "adaptive bitrate streaming ladder" for the live stream. There are different types of adaptive bitrate streaming ladders that target live streaming service 420 can use including a fixed bitrate encoding ladder, a per-title encoding ladder, or a context-aware encoding ladder. With a fixed bitrate encoding ladder, the input live stream is encoded into a number of predefined quality variants with different video resolutions and different bitrates. With a per-title encoding ladder, the complexity of the input live stream is analyzed to determine which quality variants should be used to encode the input live stream eliminating those quality variants that are redundant of other quality variants thereby reducing the total number of quality variants into which the input live stream is encoded compared to a fixed bitrate encoding ladder. A context-aware encoding ladder is like a per-title encoding ladder but, in addition to analyzing the complexity of the input live stream, quality of experience (QoE) statistics are also incorporated to select the set of quality variants into which to encode the input media stream. Such quality of experience statistics may include aggregated historical playback statistics such as, for example, the effective network bandwidth of playback devices, the types of playback devices being used for playback, and the quality variants actually requested by playback devices.

In some embodiments, different tests are executed with differently formatted test ingest feeds to test how target live streaming service 420 selects adaptive bitrate streaming ladders for the different test ingest feeds where the target live streaming service 420 uses a per-title encoding ladder approach or context-aware encoding ladder approach or other non-fixed bitrate encoding ladder for encoded input digital media streams into different quality variants for adaptive bitrate streaming. For example, after target live streaming service 420 has selected a set of quality variants for a test ingest feed, a notification of the set of quality variants selected for the test ingest feed may be sent to content management service 140 or content management service 140 may request this information from target live streaming service 420. A quality variant may be specified by its video resolution and encoding bitrate. For example, one quality variant might be 1080p @ 2366 kpbs and another quality variant might be 720p @ 2500 kbps. Ultimately, listener 230 may receive the set of selected quality variants for the test ingest feed in a status message sent or published by content management service 140. This information can be stored in database 250 as part of the test result for the test.

The set of quality variants selected by target live streaming service 420 for a test ingest feed is useful to evaluate how effective the adaptive bitrate streaming ladder algorithm of target live streaming service 420 is at selecting optimal encoding bitrates relative to a baseline algorithm (e.g., an algorithm that selects the quality variants based only on the resolution(s) and bitrate(s) of the test ingest feed). For example, evaluation of test results may reveal that for a high complexity test ingest feed as measured by PSNR or VMAF, that the ladder algorithm of target live streaming service 420 provides little or no bitrate savings over the baseline algorithm. On the other hand, evaluation of tests results may reveal that for a low-quality test ingest feed as measured by PSNR or VMAF, that the ladder algorithm of target live streaming service 420 may select fewer quality variants with higher quality than the baseline algorithm's selections.

In some embodiments, the adaptive bitrate streaming ladder algorithm to use (e.g., fixed bitrate, per-title, or context-aware) for a test is selected in the registration request for the test sent from register live stream handler 412 to content management system 140. Content management service 140 can in turn select that the selected ladder algorithm be used when requesting target live streaming service 230 to setup a new live stream. In this way, different tests can test different ladder algorithms provided by target live streaming service 420 using the same test ingest feed and the test results can be compared across tests to evaluate how effective the different ladder algorithms are at selecting different quality variants for adaptive bitrate streaming as measured in terms of number of variants, the bitrates of the variants, and the quality of the variants.

Returning now to FIG. 4, it shows traffic generator 220 including register live stream builder 410, register live stream handler 412, and compute trigger 414. To test the live stream registration process that a broadcast user performs and to initiate ingest feed network traffic into target live streaming service 420, register live stream builder 410 constructs a live stream registration request (e.g., a HTTP or HTTPS request) to send to target content management service 140. The request may include registration information about the live stream such as a name or identifier for the live stream and the geographic region of target live streaming service 420 to test.

Next, register live stream handler 412 sends the live stream registration request to content management service 140. If an error occurs sending the request (e.g., no response received or HTTP error code received), the error may be recorded in database 250 for auditing or reporting purposes as part of the test result.

Successfully sending the live stream registration request to content management service 140 may in turn cause content management service 140 to request target live streaming service 420 to prepare for a new live stream including providing an ingest locator for the new live stream for ingest by target live streaming service 420 in the geographic region targeted by the test. In addition, the request may specify an adaptive bitstream streaming ladder algorithm to use for the live stream.

After content management service 140 receives the ingest locator for the new live stream from live streaming service 420, it passes it back to register live stream handler 412. Register lives stream handler 412 then passes the ingest locator to compute trigger 414 along with other test configuration information for the test. Such other test configuration information may include, for example, the test ingest feed to use for the test selected from among a library of test ingest feeds that vary in video quality as measured by a video quality metric such as, for example, PSNR or VMAF. The test stream length may also be specified.

Compute trigger 414 is responsible for interfacing with compute service 130. In particular, compute trigger 414 manages a computing process (e.g., a thread) that is executed by compute service 130. The computing process is configured to send a test ingest feed to a given ingest locator of target live streaming service 420 according to a media ingest protocol. The media ingest protocol to use may be predefined (e.g., a default) or specified in test metadata. Such a computing process is sometimes referred to herein as an "ingest bot."

During a test, an ingest bot may also send back status information, errors and metrics to testing system 110. Status information may include an indication that the ingest bot has commenced sending the test ingest feed to the ingest locator. Errors may include any media ingest protocol errors and messages detected or received when attempting to or while sending the test ingest feed to target live streaming service 420. Metrics may include the ingest bot periodically determining and sending an ingest rate. The ingest rate may indicate a bits per second (e.g., an average kilobits per second) at which the ingest bot is transmitting the ingest feed to the target live streaming service 420 during a period of time. All of the status information, any errors or the ingest rate metrics received from the ingest bot by testing system 110 may be recorded in database 250 for subsequent auditing purposes.

2.1.3 Ingest Bot

Figure 5:
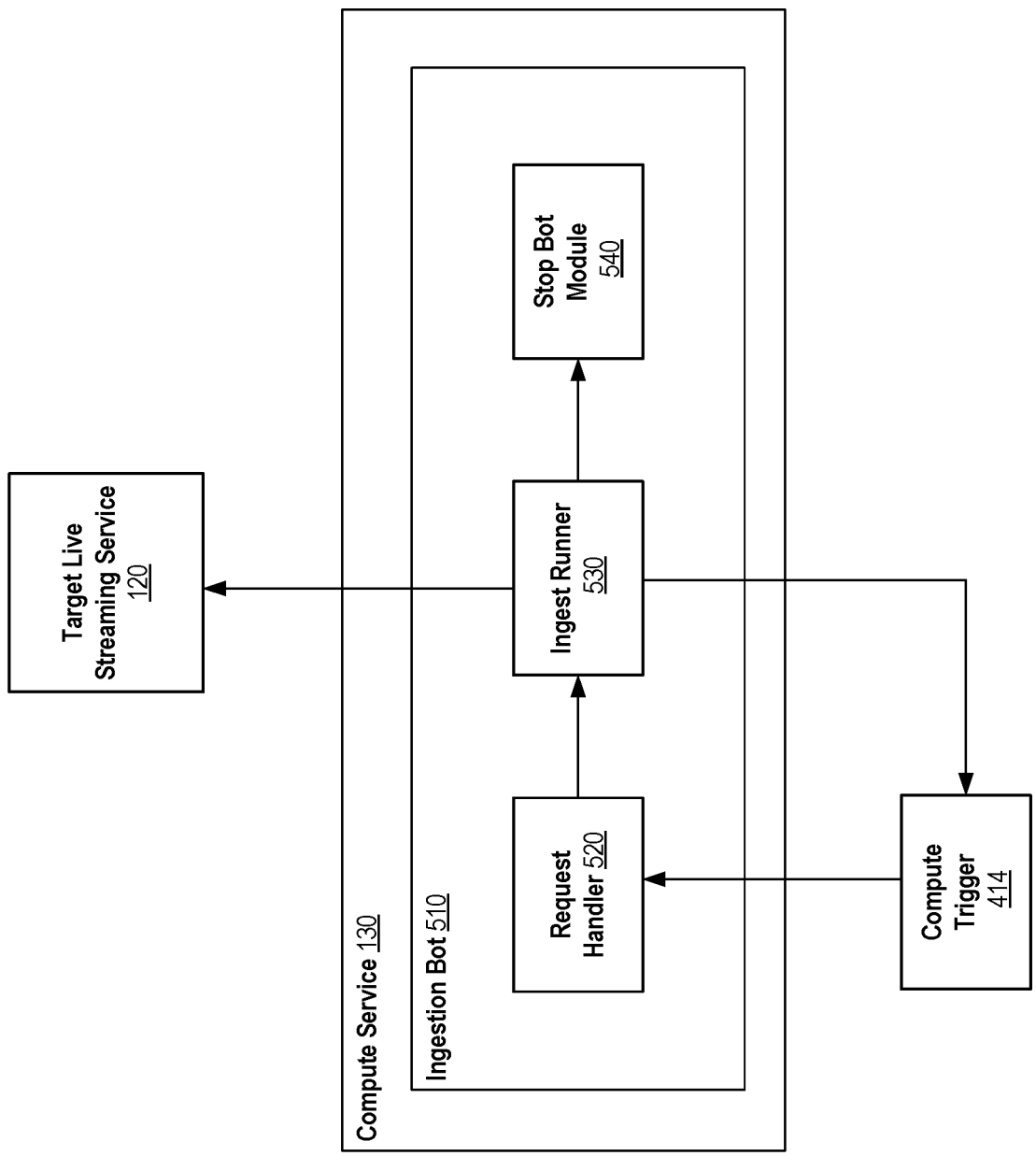
FIG. 5 illustrates one example of an ingest bot executed by a compute service.

FIG. 5 illustrates ingest bot 510 that is executed by compute service 130 for end-to-end testing of live streaming, according to some embodiments. Ingest bot 510 encompasses, as sub-modules, request handler 520, ingest runner 530, and stop bot module 540. After compute trigger 414 instructs compute service 130 to launch or spawn ingest bot 510, compute trigger 414 sends an ingest locator to request handler 520. Then, ingest runner 530 launches or spawns a computing process or thread for sending a test ingest feed to target live streaming service 120 at the ingest locator according to an ingest protocol. The test ingest feed containing the test digital audio and/or video to send according to the ingest protocol can be generated using FFmpeg library or the like. More information on FFmpeg is available on the Internet in the ffmpeg.org domain.

Once the computing process or thread begins sending the test ingest feed to target live streaming service 420, stop bot module 540 can maintain a timer with a timeout corresponding to the stream length configured for the live stream. When the timer times out after the timeout period, stop bot module 540 can kill or terminate the computing process or thread so that the sending of the test ingest feed to target live streaming service 420 stops.

Compute service 130 can run multiple ingest bots like ingest bot 510 including executing multiple ingest bots concurrently or in parallel to test multiple ingest feeds being ingested by target live streaming service 420 at the same time.

And as indicated above, ingest runner 530 can send feedback (e.g., status information, errors and ingest rate) to compute trigger 414 as the child process or thread is sending the ingest feed to target live streaming service 120. Compute trigger 414 may store the received feedback in database 250 for subsequent auditing.

2.1.4 Listener and Validator

Figure 6:
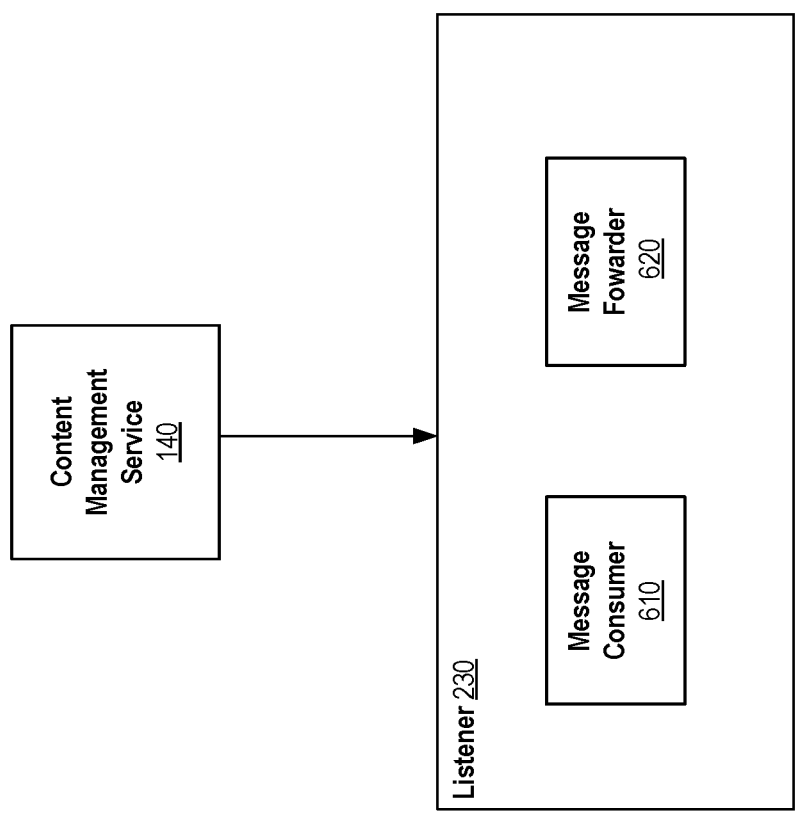
FIG. 6 illustrates one example of a listener of the example live streaming testing system.
Figure 7:
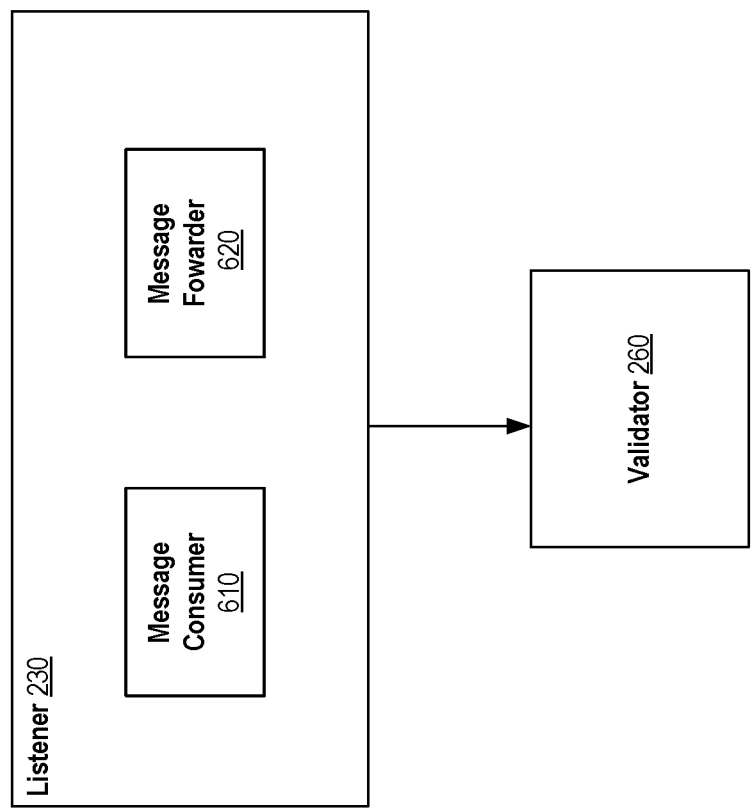
FIG. 7 illustrates one example of a validator of the example live streaming testing system.

FIG. 6 illustrates listener 230 for end-to-end testing of live streaming in greater detail. In some implementations, listener 230 is implemented as a consumer of a publish-subscription event system such as a consumer of an APACHE KAFKA instance or the like. Message consumer of listener 230 consumes status update messages pertaining to live streams under test. The status messages may be published to the publish-subscription event system by target content management service 140. The status messages may contain various information about live streams being tested. For example, a status message may contain an ingest locator for a live stream that is ready to be consumed from target live streaming service 420. Listener 230 also has message forwarder 620 that forwards status messages received by message consumer 610 onto validator 260. In some implementations, message forwarder 620 forwards only a subset of status messages received by message consumer 610 such as, for example, status messages that require action on the part of post generator 270, live player 280, or cleaner 290.

Validator 260 receives status messages from listener 230. One type of status message that validator 260 can receive contains an ingest locator for a live stream that is ready to be ingested into target live streaming service 420. In response to receiving this status message, validator 260 can provide the ingest locator to traffic generator 220 which in turn sends the ingest locator to an ingest bot executing at compute service 130. The ingest bot then uses the ingest locator to send an ingest feed for the live stream to target live streaming service 140.

Another type of status message that validator 260 can receive contains a streaming locator when the live stream is ready to be consumed from target live streaming service 420. In response to receiving this status message, validator 260 can verify with target live streaming service 420 that the live stream is actually ready to be consumed from target live streaming service 420 including being available for consumption from endpoint servers of the target live streaming service 420. If validator 260 can verify this, then validator 260 may invoke post generator 270 to test submission of a content post about the live stream to target content management service 140 and may invoke live player 280 to begin consuming the live stream from target live streaming service 420. Functions and operations of post generator 270 are described in the next section.

Yet another type of status message that validator 260 can receive indicates that a live stream has concluded. In response to receiving this status message, validator 260 can invoke cleaner 290 to perform shutdown and garbage collection operations for the live stream and conclude the test of the live stream.

Validator 260 may also record status messages it receives including any errors associated therewith in database 250 for subsequent auditing and test evaluation purposes.

2.1.5 Post Generator

Figure 8:
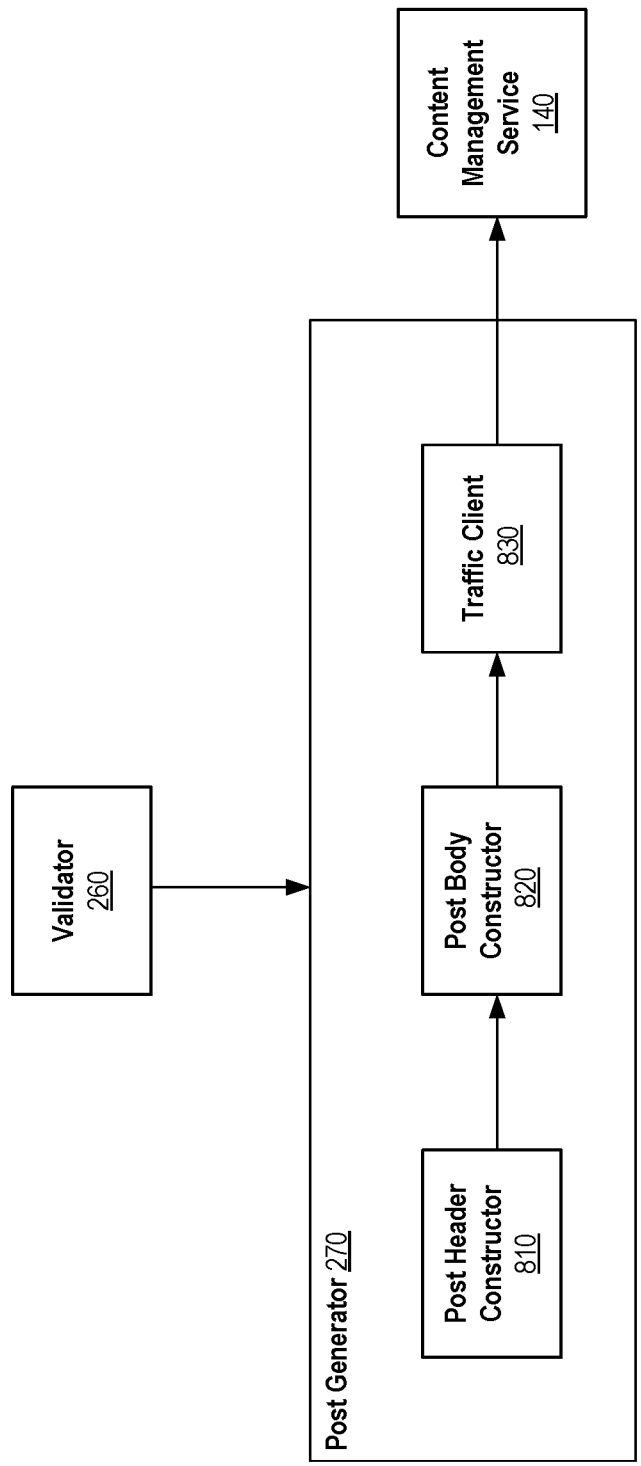
FIG. 8 illustrates one example of a post generator of the example live streaming testing system.

FIG. 8 illustrates post generator 270 for end-to-end testing of live streaming in greater detail, according to some embodiments. Post generator 270 receives a streaming locator from validator 260 for a test live stream that is ready to be consumed from target live streaming service 420. Post header constructor 810 and post body constructor 820 generate a HTTP/HTTPS request for submission to content management service 140. The request is to create a content post about the live stream that includes the streaming locator.

Once the request is prepared by header constructor 810 and body constructor 820, traffic client 820 may submit the content post request to target content management service 140. Indication of success or any errors (e.g., HTTP errors) in submitting the content post request may be recorded in database 250 by traffic client 820.

2.1.6 Live Player

Figure 9:
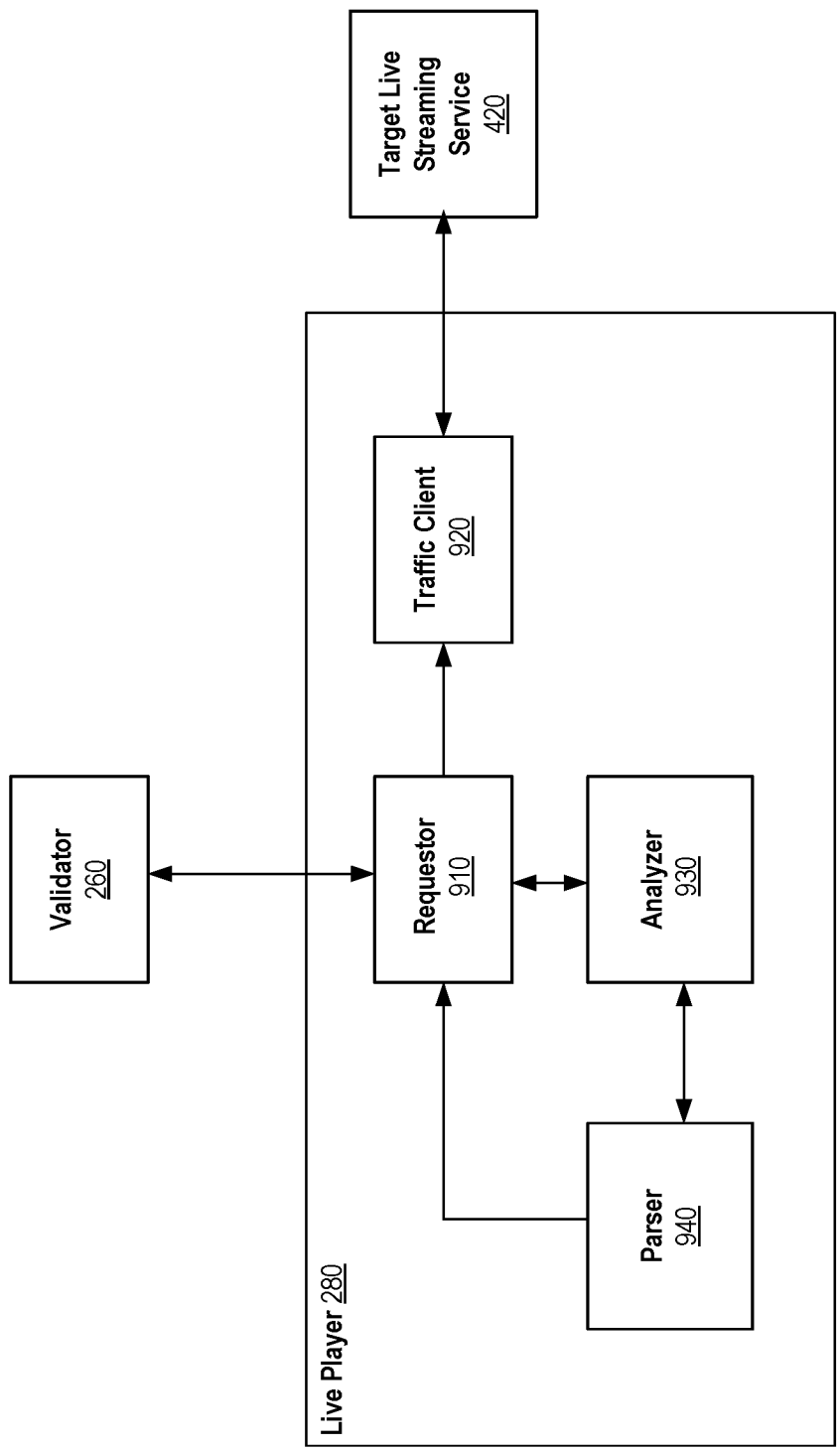
FIG. 9 illustrates one example of a live player of the example live streaming testing system.

FIG. 9 illustrates live player 280 in greater detail. In some implementations, live player 280 operates "headless." That is, live player 280 consumes a live stream from target live streaming service 420 but does not playback the media content. Instead, live player 280 collects playback metrics about the live stream being consumed and records the live metrics in database 250 for subsequent auditing, reporting, aggregation or other analysis. In some implementations, the playback metrics include bit rate, buffer fill time, lag length, and lag ratio.

Bit rate refers to how many bits of digital media information are transmitted over the network during a period of time. In general, the higher the bit rate, the higher the quality of the playback. For example, digital video might be transmitted over a data communications network at 3.5 Megabits per second (Mbps) for standard definition television up to between 8 and 15 Mbps for High-Definition TeleVision (HDTV).

Buffer fill refers to the time spent filling a playback buffer at an end-user device after playback is started by the end-user and before presentation of the media begins. An end-user may abandon or abort a playback if the buffer fill is too long.

Lag length refers to the total time during playback that presentation of media is paused while waiting for the playback buffer to be filled with media data. A lag length that is greater than the buffer fill indicates that presentation of the media was interrupted after the presentation began Lag ratio is the ratio of lag length to presentation time. A lower lag ratio is preferable from the end-user's perspective.

Returning again to FIG. 9, during operation, requestor 910 obtains a streaming locator for a live stream from validator 260. The streaming locator is passed on to traffic client 920 which uses the streaming locator to download a master playlist file (e.g., in M3U format) for the live stream from an endpoint server of target live streaming service 420. The master playlist file contains a list of all of the live stream's available bitrates and associated playlist locators (e.g., Uniform Resource Indicators). The downloaded master playlist file is passed from traffic client 920 to requestor 910 which in turn passes the master playlist file to analyzer 930.

Analyzer 930 passes the master playlist file to parser 940 which parses the master playlist file for the list of available bitrates and associated playlist locators. If there is an error downloading or parsing the master playlist file, the error may be reported to requestor 910 which in turn reports the error to validator 260 for subsequent storage in database 250 where thereafter the error can be subject to further auditing, reporting, or analysis by alert system 240.

If there are no errors downloading or parsing the master playlist file, analyzer 930 may pass one or more playlist locators parsed from the master playlist file to requestor 910. The master playlist file may include multiple playlist locators if there are multiple quality variants available. For example, the master playlist file may include a different playlist locator for each different video resolution and bitrate combination selected by target live streaming service 420 according to the adaptive bitrate streaming ladder algorithm used for the live stream. Requestor 910 in turn requests traffic client 920 to download the playlist file(s) at the playlist locator(s) from endpoint servers of target live streaming service 420. Each playlist file may include multiple segment locators for different playback segments (portions) of the live stream.

Each of the downloaded playlist file(s) may be parsed and analyzed, and any errors stored in database 250. If there are no errors, segment locators (URIs) parsed from playlist file(s) are sent to requestor 910 that uses traffic client 920 to download playback segment files from endpoint servers of target live streaming service 420. Playlist file(s) at playlist locator(s) may be periodically re-requested by live player 280 from endpoint servers of target live streaming service 420 to obtain an updated list of segment locators for the live stream.

Live player 280 can download all playback segment files for all available bitrates to test all available bitrates. Alternatively, live player 280 can simulate an adaptive bitrate player by implementing an adaptive bitrate algorithm such as a throughput-based algorithm that uses throughput achieved in recent prior segment downloads to decide whether to switch between different available bitrates, a buffer-based algorithm that monitor's the live player's 280 current buffer level to decide whether to switch between different available bitrates, and a hybrid algorithm that combines both throughput-based feedback and buffer feedback. In either case, live player 280 can periodically measure and collect playback metrics including bit rate, buffer fill time, lag length and lag ratio and store the metrics back in database 250 and subsequent auditing, analysis, reporting, or other processing by reporting system 240.

In some implementations, a test ingest feed ingested by target live streaming service 420 supports adaptive bitrate streaming. Adaptive bitrate streaming is a technique used in streaming multimedia over data communications networks. Currently, most adaptive streaming techniques on the media delivery side to viewer computing devices are based on the HTTP or HTTPS protocol. While adaptive streaming technologies on the ingest side can be based on HTTP or HTTPS, non-HTTP-based adaptive streaming protocols are still used for ingest (e.g., RTMP or RTMPS).

For the test ingest feed to support adaptive bitrate streaming, the digital media of test ingest feed ingested by target live streaming service 420 may be encoded at multiple different bitrates. Alternatively, if target live streaming service 420 provides live encoding capabilities, target live stream service 420 can ingest a test ingest feed having media encoded at a single bitrate. In this case, the live encoder of target live streaming service 420 may reencode the digital media at multiple different bitrates for adaptive bitrate streaming. In some embodiments, the digital media (e.g., the digital video) of test ingest feed is encoded at a single bitrate for the purpose of testing the live encoding capability of target live streaming service 420.

In some implementations, an adaptive bitrate algorithm is implemented by live player 280 to test target live streaming service's 420 ability to deliver a live stream at different bitrates. Multi-second segments of live streams may be stored at endpoint servers of live streaming service 420. Different segments of a live stream may encode the live stream at different bitrates. Different segments can have different byte sizes depending on the playback length of the segment (e.g., between two and ten seconds) and the encoding bitrate where higher bitrates result in large segment sizes and lower bitrates result in smaller segment sizes.

To consume a live stream from target live streaming service 420 according to an adaptive bitrate algorithm, live player 280 may first download a manifest file from an endpoint server of target live streaming service 120. The manifest file describes available segments and their respective bit rates. To test adaptive bitrate streaming, live player 280 may request segments at different bitrates calculating one or more playback metrics while doing so. For example, if the download bitrate calculated for one or more segments is substantially lower than the encoding bitrate of the one or more segments, then this may indicate network congestion in the data communications network (e.g., 150) between the live player 280 and the endpoint server of target live streaming service 420 from which the segments are downloaded. Alternatively, it may indicate that the CDN or the provider of the target live streaming service 420 is throttling (capping) the bitrate at which segments can be downloaded from the endpoint server.

2.1.7 Cleaner

Figure 10:
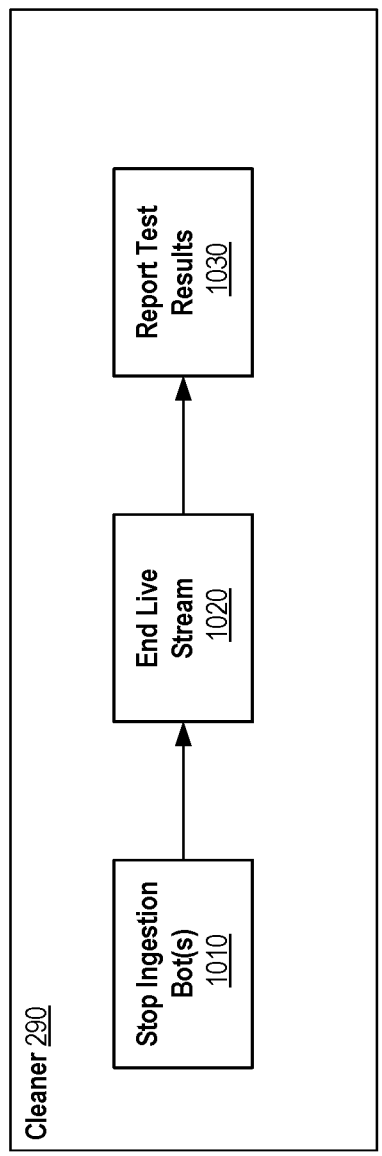
FIG. 10 illustrates one example of a cleaner of the example live streaming testing system.

FIG. 10 illustrates cleaner 290 in greater detail. Cleaner 290 make be invoked after validator 260 receives a status message from target content management service 140 that a live stream has ended where target content management service 140 is notified of the end of the live stream by target live streaming service 120. Target live streaming service 120 may notify target content management service 140 that a live stream has ended after an ingest bot at compute service 130 stops sending the ingest feed for the live stream.

When validator 260 invokes cleaner 290 after a live stream has ended, cleaner 290 may communicate with traffic generator 220 to confirm that the ingest feed for the live stream is no longer being sent from the ingest bot at compute service 130. For this, traffic generator 220 may communicate with the ingest bot at compute service 130 to make this confirmation. If the ingest bot is still sending the ingest feed then an error may have occurred and traffic generator 220 instructs the ingest bot to stop sending the ingest feed.

Assuming confirmation that the ingest feed is no longer being sent is made, cleaner 290 may then communicate with target live streaming service 120 to confirm that the live stream has ended and to delete or garbage collect segment files for the live stream from origin and cache servers.

Finally, cleaner 290 may generate a report for presentation in web browser or other computer user interface that provides results of the live stream test. The report may include such information as the ingest rate and the playback metrics discussed above as well as any errors and error messages that occurred that can be obtained from database 250 for the live stream.

2.1.8 Reporting System

Testing system 110 includes reporting system 240. For each test that is conducted, testing system 110 can send the results of testing operations to reporting system 240. For example, for each of the test operations performed by one or more of test scheduler 210, traffic generator 220, listener 230, validator 260, post generator 270, live player 280 and cleaner 290 for a test, data regarding the performance of target live streaming service 420 and content management service 140 during the test can be sent to reporting system 240. Such data may include ingest metrics such as, for example, an ingest rate as a time series over the ingest stream length and playback metrics such as, for example, a download bitrate as a time series.

Reporting system 240 can be implemented as its own system that is programmed for generating reports, or as a database that may be queried for test results. In some embodiments, reporting system 240 is SQL database that would allow a user or another system to perform queries on test results to retrieve meaningful information regarding the tests conducted. In some embodiments, reporting system 240 may generate and send device notifications, instant messages, social media updates, emails, spreadsheets, API notifications, or other types of updates regarding test results to testing personnel or other testing and reporting computing systems.

3.0 Example Process

Figure 11:
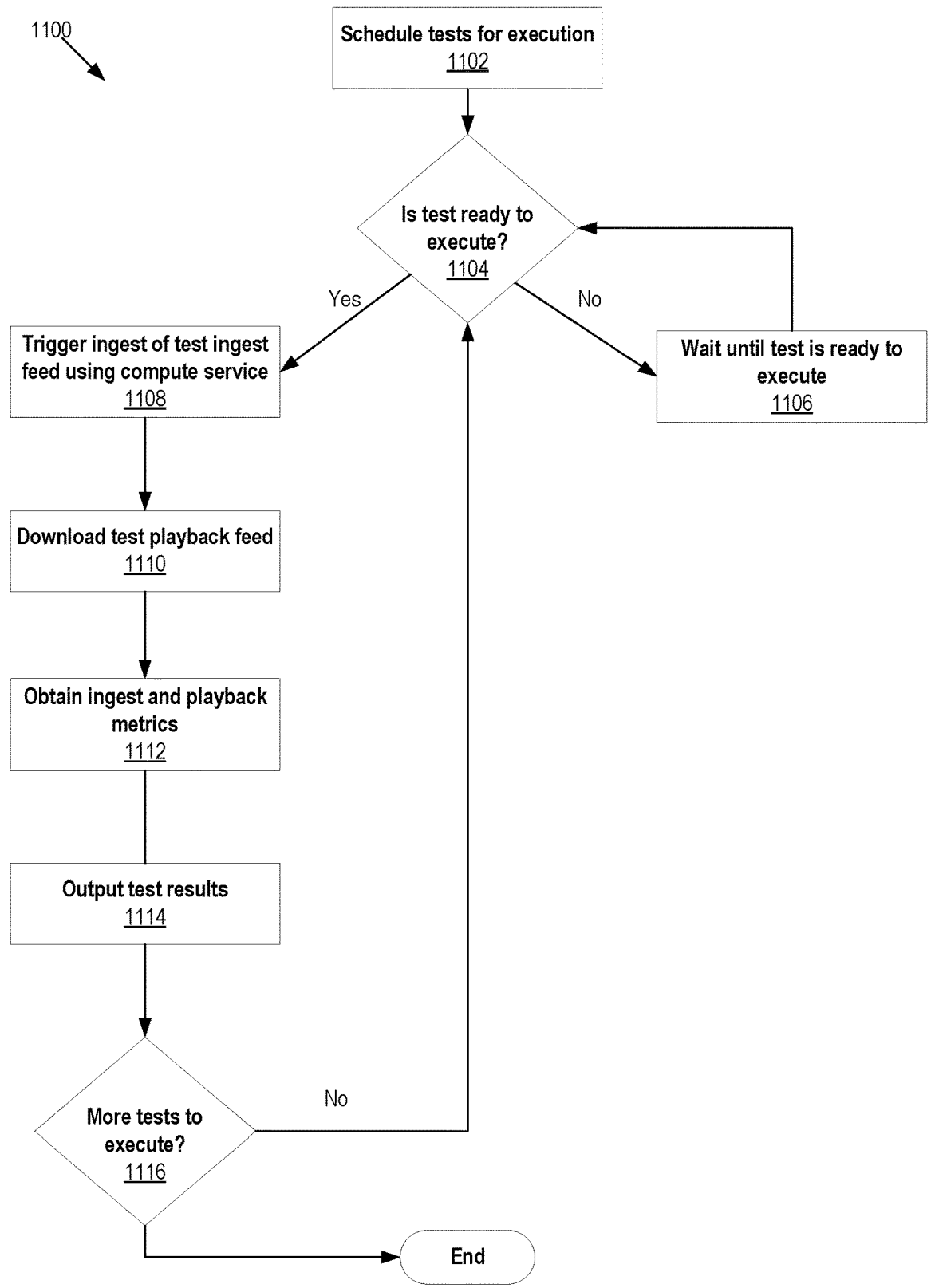
FIG. 11 illustrates a process for end-to-end live testing of live digital media streaming.

FIG. 11 illustrates a process 1100 of end-to-end testing of target live streaming service 420, as described above. Process 1100 may be implemented using testing system 110 of FIG. 1 and FIG. 2. Thus, the flow diagram of FIG. 6 will serve as a functional specification that a skilled person may use to write, debug, execute, and otherwise program one or more computer programs, methods, and/or algorithms, using any suitable language or programming environment such as JAVA, C++, OBJECTIVE-C, C, or to design the gate structure, layout or programming of ASICS or FPGAs, or other logic, special-purpose computers or general-purpose computers loaded with stored programs.

Referring to FIG. 11, in block 1102, one or more live streaming tests are scheduled with test scheduler 210 for execution. For example, the live streaming tests may be scheduled with test scheduler 210 by a user using a computer interface (e.g., a command line or graphical user interface). Each such test may be scheduled with test scheduler 210 to execute periodically according to a cron expression or the like. Metadata associated with a scheduled test may define test parameters such as, for example, the test digital video and/or audio content to send in the test ingest feed for the test. The selected test digital video and/or audio content may be selected from a predefined media library providing different levels of digital media quality for testing purposes. Metadata may specify other testing parameters such as, for example, the target geographic region in which to test live streaming service 120 and an amount of time for which to input the test ingest feed into the live streaming service 120.

In block 1104, the process 1100 determines whether a test is ready to execute according to the set of tests scheduled 1102 with test scheduler 210. If a test is not ready to execute, then control passes to block 1106. Otherwise, if a test is ready to execute, then control passes to block 1108.

At block 1106, process 1100 waits until a test is ready to execute according to the set of tests scheduled 1102 with test scheduler 210, at which time control passes back to block 1104.

The operations of blocks 1108, 1110, 1112, 1114, and 1116 are performed in the context of a "target" test that is ready to execute.

At block 1108, traffic controller 220 triggers compute service 130 to send the test ingest feed for the target test to target live streaming service 420. In doing so, traffic controller 220 provides the ingest locator for the target test and the target live streaming service 420. In some embodiments, the test ingest feed encodes digital media at a single bitrate. In this case, target live streaming service 420 may package the input digital media for adaptive bitrate streaming playback at multiple different bitrates according to an adaptive bitrate streaming ladder algorithm. In some embodiments, the test ingest feed encodes digital media at multiple bitrates. In this case, target live streaming service 420 may package the input digital media for adaptive bitstream streaming playback at the multiple different bitrates of the test ingest feed. In some embodiments, the test ingest feed is transmitted to target live media streaming service 420 according to media ingest protocol such as, for example, RTMP or a variant thereof.

At block 1110, live player 280 downloads playback media segments at different bitrates according to adaptive bitrate streaming algorithm from endpoint servers of target live streaming service 420. In some embodiments, a playback media segment comprises video encoded at a particular bitrate and is transmitted from an endpoint server of target live streaming service 420 to live player 280 according to a streaming media protocol such as, for example, MPEG-DASH, HLS, or SMOOTH STREAMING protocol.

At block 1112, ingest metrics and playback metrics are obtained from traffic generator 220 and live player 280, respectively. In some embodiments, the ingest metrics may encompass a time series of the measured ingest rate of the test ingest feed transmitted from compute service 130 to target live streaming service 420. In some embodiments, the playback metrics may encompass one or more time series of one or more of the following playback metrics: bit rate, buffer fill time, lag length, or lag ratio.

At block 1114, the obtained ingest metrics and playback metrics are output as results to reporting system 240, database 250, or a report summarizing test results. For example, the report may be presented in a web page or the like and may indicate average ingest rate and average download rates for the test as well as any errors detected during the test.

At block 1116, testing system 1100 determines whether there are additional tests to be executed according to the testing schedule. If there are additional tests to be executed, then process 1100 passes control to block 1104. If there are no additional tests to be executed according to the testing schedule, then process 1100 may end.

4.0 Implementation Mechanisms—Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
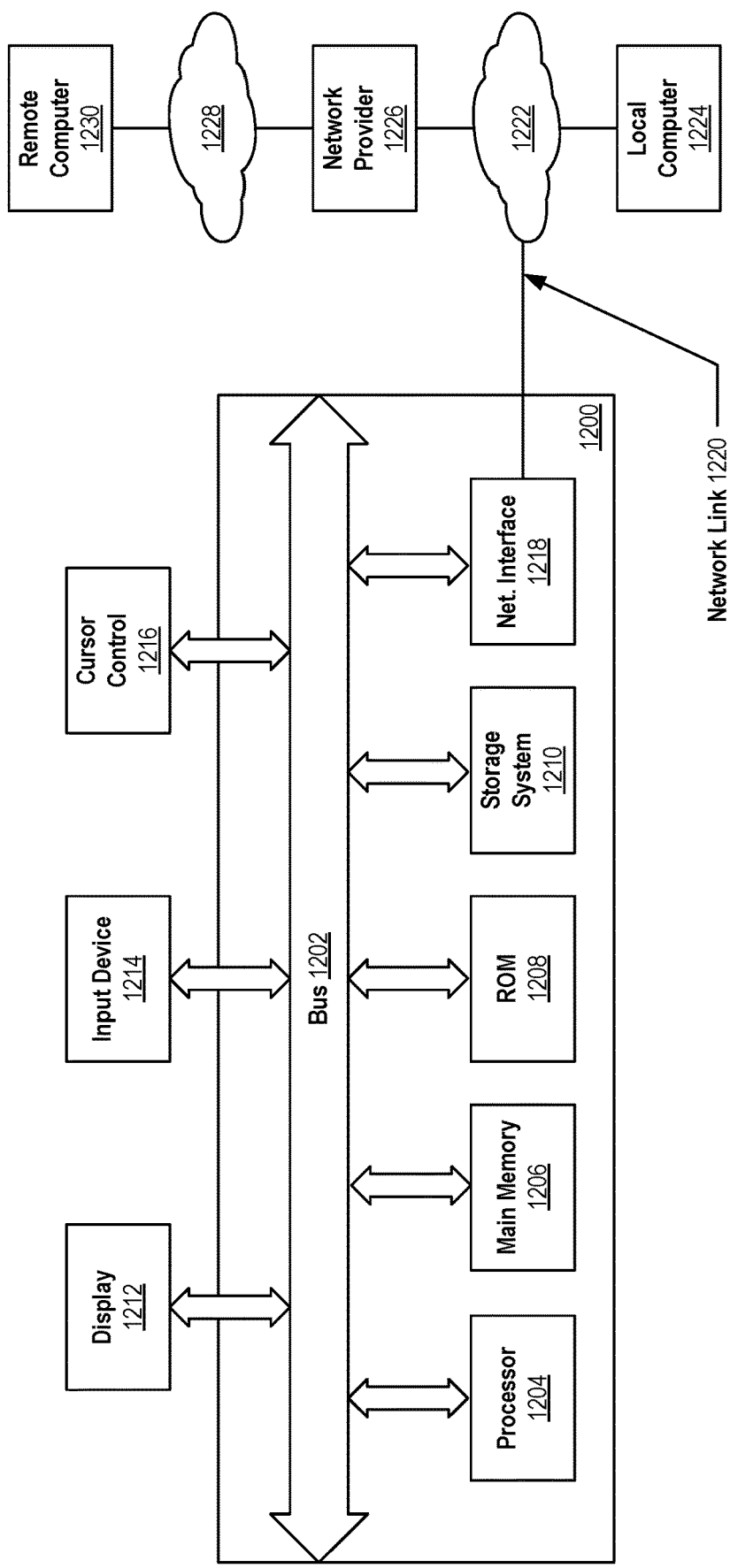
FIG. 12 illustrates a computer system upon which an embodiment of the invention may be implemented.

Referring now to FIG. 12, it is a block diagram that illustrates a special-purpose computing device 1200 in which the example embodiment(s) of the present invention may be embodied. Computing device 1200 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 1200 may include a bus 1202 or other communication mechanism for addressing main memory 1206 and for transferring data between and among the various components of device 1200.

Computing device 1200 may also include one or more hardware processors 1204 coupled with bus 1202 for processing information. A hardware processor 1204 may be a general-purpose microprocessor, a central processing unit (CPU), a system on a chip (SoC), a graphics processing unit (GPU), or other hardware processor.

Main memory 1206, such as a random-access memory (RAM) or other dynamic storage device, also may be coupled to bus 1202 for storing information and software instructions to be executed by processor(s) 1204. Main memory 1206 also may be used for storing temporary variables or other intermediate information during execution of software instructions to be executed by processor(s) 1204.

Software instructions, when stored in storage media accessible to processor(s) 1204, render computing device 1200 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, webpages, web applications, plugins, embedded software, microcode, compilers, debuggers, interpreters, virtual machines, linkers, and text editors.

Computing device 1200 also may include read only memory (ROM) 1208 or other static storage device coupled to bus 1202 for storing static information and software instructions for processor(s) 1204.

One or more mass storage devices 1210 may be coupled to bus 1202 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 1210 (e.g., the main hard disk for the device) stores a body of program and data for directing operation of the computing device, including an operating system, user application programs, driver and other support files, as well as other data files of all sorts.

Computing device 1200 may be coupled via bus 1202 to display 1212, such as a liquid crystal display (LCD) or other electronic visual display, for displaying information to a computer user. In some configurations, a touch sensitive surface incorporating touch detection technology (e.g., resistive, capacitive, etc.) may be overlaid on display 1212 to form a touch sensitive display for communicating touch gesture (e.g., finger or stylus) input to processor(s) 1204.

An input device 1214, including alphanumeric and other keys, may be coupled to bus 802 for communicating information and command selections to processor 1204. In addition to or instead of alphanumeric and other keys, input device 1214 may include one or more physical buttons or switches such as, for example, a power (on/off) button, a "home" button, volume control buttons, or the like.

Another type of user input device may be a cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

While in some configurations, such as the configuration depicted in FIG. 12, one or more of display 1212, input device 1214, and cursor control 1216 are external components (e.g., peripheral devices) of computing device 1200, some or all of display 1212, input device 1214, and cursor control 1216 are integrated as part of the form factor of computing device 1200 in other configurations.

Functions of the disclosed systems, methods, and modules may be performed by computing device 1200 in response to processor(s) 1204 executing one or more programs of software instructions contained in main memory 1206. Such software instructions may be read into main memory 1206 from another storage medium, such as storage device(s) 810. Execution of the software instructions contained in main memory 1206 cause processor(s) 804 to perform the functions of the example embodiment(s).

While functions and operations of the example embodiment(s) may be implemented entirely with software instructions, hard-wired or programmable circuitry of computing device 1200 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random-access memory (NVRAM), flash memory, optical disks, magnetic disks, or solid-state drives, such as storage device 1210. Volatile media includes dynamic memory, such as main memory 1206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more software instructions to processor(s) 1204 for execution. For example, the software instructions may initially be carried on a magnetic disk or solid-state drive of a remote computer. The remote computer can load the software instructions into its dynamic memory and send the software instructions over a telephone line using a modem. A modem local to computing device 800 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor(s) 1204 retrieves and executes the software instructions. The software instructions received by main memory 1206 may optionally be stored on storage device(s) 1210 either before or after execution by processor(s) 1204.

Computing device 1200 also may include one or more communication interface(s) 1218 coupled to bus 1202. A communication interface 1218 provides a two-way data communication coupling to a wired or wireless network link 1220 that is connected to a local network 1222 (e.g., Ethernet network, Wireless Local Area Network, cellular phone network, Bluetooth wireless network, or the like). Communication interface 1218 sends and receives electrical, electromagnetic, or optical signals that carry digital data streams representing various types of information. For example, communication interface 1218 may be a wired network interface card, a wireless network interface card with an integrated radio antenna, or a modem (e.g., ISDN, DSL, or cable modem).

Network link(s) 1220 typically provide data communication through one or more networks to other data devices. For example, a network link 1220 may provide a connection through a local network 1222 to a host computer 1224 or to data equipment operated by an Internet Service Provider (ISP) 1226. ISP 1226 in turn provides data communication services through the world wide packet data communication network now commonly referred to as the "Internet" 828. Local network(s) 1222 and Internet 1228 use electrical, electromagnetic or optical signals that carry digital data streams. The signals through the various networks and the signals on network link(s) 1220 and through communication interface(s) 1218, which carry the digital data to and from computing device 800, are example forms of transmission media.

Computing device 1200 can send messages and receive data, including program code, through the network(s), network link(s) 1220 and communication interface(s) 1218. In the Internet example, a server 1230 might transmit a requested code for an application program through Internet 1228, ISP 1226, local network(s) 1222 and communication interface(s) 1218.

The received code may be executed by processor 1204 as it is received, and/or stored in storage device 1210, or other non-volatile storage for later execution.

5.0 Other Aspects of Disclosure

The foregoing description describes computer-implemented techniques to facilitate end-to-end testing of live streaming service 120 and content management service 140 providing a live streaming platform integrated with live streaming service 120 to its users. Beneficially, the techniques can be used to test live stream ingest at scale and in different geographic regions. Further, the techniques encompass live player 280 that can be used to test delivery and consumption of adaptive bitrate live streams that are delivered from endpoint servers of live streaming service 120.

Conditional language used herein, such as, "can," "could," "might," "may," "e.g.," is intended to convey that certain implementations include, while other implementations do not include, certain features, elements and/or steps. Thus, such conditional language indicates that that features, elements and/or steps are not required for some implementations. The terms "comprising," "including," "having," and the like are synonymous, used in an open-ended fashion, and do not exclude additional elements, features, acts, operations. Unless the context clearly indicates otherwise, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood to convey that an item, term, etc. may be either X, Y or Z, or a combination thereof. Thus, such conjunctive language is not intended to imply that certain embodiments require at least one of X, at least one of Y and at least one of Z to each be present.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method comprising:
   scheduling a plurality of live streaming tests for execution;
   detecting a scheduled time to execute a first live streaming test of the plurality of live streaming tests;
   executing the first live streaming test, including:
      triggering a compute service to send a test ingest feed to a live digital media streaming service;
      based on the compute service sending the test ingest feed to the live digital media streaming service, receiving, from the live digital media streaming service, a message comprising a streaming locator associated with the test ingest feed;
      using the streaming locator to download, from one or more endpoint servers associated with the live digital media streaming service, a set of playback segments corresponding to the test ingest feed;
      obtaining a set of one or more ingest metrics and a set of one or more playback metrics; and
      outputting results of the obtaining to a system, database, or report.

2. The method of claim 1, wherein the executing the first live streaming test further includes:
   sending a request to a content management service specifying a target geographic region for the live digital media streaming service;
   based on the request, receiving a message providing an ingest locator for the live digital media streaming service in the target geographic region; and
   triggering a compute service to send a test ingest feed to the live digital media streaming service in the target geographic region as part of executing the first live streaming test.

3. The method of claim 1, wherein
   obtaining the set of one or more ingest metrics obtained comprises obtaining an ingest rate metric from the compute service reflecting a rate at which the test ingest feed is being sent from the compute service.

4. The method of claim 1, wherein the executing the first live streaming test further includes:
   configuring a computing process at the compute service to stop sending the test ingest feed to the live digital media streaming service after a predetermined amount of time.

5. The method of claim 1, wherein at least one of the set of playback metrics is selected from the group consisting of a download bitrate, a buffer fill time, a lag length and a lag ratio.

6. The method of claim 1, wherein the executing the first live streaming test further includes:
   based on receiving the message providing the streaming locator associated with the test ingest feed, generating a request to send to a content management service for posting a content item, the request comprising the streaming locator;
   sending the request to the content management service;
   receiving a response to the request from the content management service; and
   storing the response in a database.

7. The method of claim 1, wherein the executing the first live streaming test further includes:
   using the streaming locator to download a master playlist file associated with the test ingest feed;
   parsing a first playlist locator from the master playlist file, the first playlist locator associated with a first bitrate;
   using the first playlist locator to download a first playlist file associated with the test ingest feed;
   parsing a first plurality of segment locators from the first playlist file;
   using the first plurality of segment locators to download a first plurality of playback segments, of the set of playback segments, having video data encoded at the first bitrate;
   parsing a second playlist locator from the master playlist file, the second playlist locator associated with a second bitrate;
   using a second playlist file associated with the test ingest feed;
   parsing a second plurality of segment locators from the second playlist file;
   using the second plurality of segment locators to download a second plurality of playback segments, of the set of playback segments, having video data encoded at the second bitrate; and
   wherein the obtaining the set of playback metrics includes obtaining at least a first playback metric reflecting the downloading of the first plurality of playback segments having video data encoded at the first bitrate and a second playback metric reflecting the downloading of the second plurality of playback segments having video data encoded at the second bitrate.

8. The method of claim 1, wherein:
   the test ingest feed is a first test ingest feed;
   the set of playback segments if a first set of playback segments;
   the set of ingest metrics is a first set of ingest metrics;
   the set of playback metrics is a first set of playback metrics;
   the method further comprises detecting a scheduled time to execute a second live streaming test of the plurality of live streaming tests, and executing the second live streaming test;
   the executing the second live streaming test includes:
      triggering the compute service to send a second test ingest feed to the live digital media streaming service;
      downloading, from one or more endpoint servers associated with the live digital media streaming service, a second set of playback segments corresponding to the second test ingest feed;
      obtaining a second set of one or more ingest metrics and a second set of one or more playback metrics; and outputting results of the obtaining the second set of ingest metrics and the second set of playback metrics to a system, database, or report.

9. The method of claim 1, wherein the executing the first live streaming test further includes:
sending a request to a content management service specifying an adaptive bitrate streaming ladder algorithm for the live digital media streaming service to use when selecting a set of video quality variants for playback segments generated by the live digital media streaming service based on the test ingest feed.

10. The method of claim 1, wherein one of the set of ingest metrics is an ingest rate of the test ingest feed.

11. A live streaming testing computing system comprising:
one or more processors;
non-transitory computer-readable media; and
instructions stored in the non-transitory computer-readable media which, when executed by the live streaming testing computing system, cause the live streaming testing computing system to perform:
scheduling a plurality of live streaming tests for execution;
detecting a scheduled time to execute a first live streaming test of the plurality of live streaming tests;
executing the first live streaming test including:
triggering a compute service to send a test ingest feed to a live digital media streaming service;
based on the compute service sending the test ingest feed to the live digital media streaming service, receiving, from the live digital media streaming service, a message comprising a streaming locator associated with the test ingest feed;
using the streaming locator to download, from one or more endpoint servers associated with the live digital media streaming service, a set of playback segments corresponding to the test ingest feed;
obtaining a set of one or more ingest metrics and a set of one or more playback metrics; and
outputting results of the obtaining to a system, database, or report.

12. The live streaming testing computing system of claim 11, wherein the executing the first live streaming test further includes:
sending a request to a content management service specifying a target geographic region for the live digital media streaming service;
based on the sending the request, receiving a message providing an ingest locator for the live digital media streaming service in the target geographic region; and
triggering a compute service to send a test ingest feed to the live digital media streaming service in the target geographic region as part of executing the first live streaming test.

13. The live streaming testing computing system of claim 11, wherein
obtaining the set of one or more ingest metrics comprises obtaining an ingest rate metric from the compute service reflecting a rate at which the test ingest feed is being sent from the compute service.

14. The live streaming testing computing system of claim 11, wherein the executing the first live streaming test further includes:
configuring a computing process at the compute service to stop sending the test ingest feed to the live digital media streaming service after a predetermined amount of time.

15. The live streaming testing computing system of claim 11, wherein the executing the first live streaming test further includes:
based on receiving the message providing the streaming locator associated with the test ingest feed, generating a request to send to a content management service for posting a content item, the request comprising the streaming locator;
sending the request to the content management service;
receiving a response to the request from the content management service; and
storing the response in a database.

16. The live streaming testing computing system of claim 11, wherein the executing the first live streaming test further includes:
using the streaming locator to download a master playlist file associated with the test ingest feed;
parsing a first playlist locator from the master playlist file, the first playlist locator associated with a first bitrate;
using the first playlist locator to download a first playlist file associated with the test ingest feed;
parsing a first plurality of segment locators from the first playlist file;
using the first plurality of segment locators to download a first plurality of playback segments, of the set of playback segments, having video data encoded at the first bitrate;
parsing a second playlist locator from the master playlist file, the second playlist locator associated with a second bitrate;
using a second playlist file associated with the test ingest feed;
parsing a second plurality of segment locators from the second playlist file;
using the second plurality of segment locators to download a second plurality of playback segments, of the set of playback segments, having video data encoded at the second bitrate; and
wherein the obtaining the set of playback metrics as part of executing the first live streaming test includes obtaining at least a first playback metric reflecting the downloading of the first plurality of playback segments having video data encoded at the first bitrate and a second playback metric reflecting the downloading of the second plurality of playback segments having video data encoded at the second bitrate.

17. The live streaming testing computing system of claim 11, wherein:
the test ingest feed is a first test ingest feed;
the set of playback segments is a first set of playback segments;
the set of ingest metrics is a first set of ingest metrics;
the set of playback metrics is a first set of playback metrics;
the instructions, when executed by the live streaming testing computing system, cause the live streaming testing computing system to further perform detecting a scheduled time to execute a second live streaming test of the plurality of live streaming tests, and executing the second live streaming test;
the executing the second live streaming test includes:
triggering the compute service to send a second test ingest feed to the live digital media streaming service;
downloading, from one or more endpoint servers associated with the live digital media streaming service, a second set of playback segments corresponding to the second test ingest feed;

obtaining a second set of one or more ingest metrics and a second set of one or more playback metrics; and outputting results of the obtaining the second set of ingest metrics and the second set of playback metrics to a system, database, or report.

18. The live streaming testing computing system of claim 11, wherein the executing the first live streaming test further includes:

sending a request to a content management service specifying an adaptive bitrate streaming ladder algorithm for the live digital media streaming service to use when selecting a set of video quality variants for playback segments generated by the live digital media streaming service based on the test ingest feed.

19. The live streaming testing computing system of claim 11, wherein one of the one or more ingest metrics is an ingest rate of the test ingest feed.

20. A system comprising:

a test scheduler for scheduling a set of live streaming tests;

a traffic generator for causing a compute service to send test ingest feeds to a live digital media streaming service and for receiving, from the live digital media streaming service, messages comprising streaming locators associated with the test ingest feeds;

a live player for using the streaming locators for downloading playback segments corresponding to the test ingest feeds from the live digital media streaming service;

one or more processors;

storage media; and instructions stored in the storage media which, when executed by the one or more processors, cause the one or more processors to:

obtain a set of ingest metrics and a set of playback metrics pertaining to the set of live streaming tests; and output the set of ingest metrics and the set of playback metrics to a system, database, or report.

\* \* \* \* \*